(12) United States Patent
Imes

(10) Patent No.: US 10,771,934 B2
(45) Date of Patent: Sep. 8, 2020

(54) APPARATUS, SYSTEM, METHODS AND NETWORK FOR COMMUNICATING INFORMATION ASSOCIATED WITH DIGITAL IMAGES

(71) Applicant: Kevin R. Imes, Austin, TX (US)

(72) Inventor: Kevin R. Imes, Austin, TX (US)

(*) Notice: Subject to any disclaimer, the term of this patent is extended or adjusted under 35 U.S.C. 154(b) by 0 days.

(21) Appl. No.: 16/168,960

(22) Filed: Oct. 24, 2018

(65) Prior Publication Data
US 2019/0058975 A1   Feb. 21, 2019

Related U.S. Application Data

(63) Continuation of application No. 15/483,073, filed on Apr. 10, 2017, now abandoned, which is a (Continued)

(51) Int. Cl.
| | |
|---|---|
| *H04W 4/18* | (2009.01) |
| *H04W 4/80* | (2018.01) |
| *H04L 29/06* | (2006.01) |
| *H04M 1/247* | (2006.01) |
| *H04W 12/08* | (2009.01) |

(52) U.S. Cl.
CPC .......... *H04W 4/18* (2013.01); *H04L 65/4069* (2013.01); *H04W 4/80* (2018.02); *H04M 1/2472* (2013.01); *H04M 2201/42* (2013.01); *H04M 2250/02* (2013.01); *H04M 2250/10* (2013.01); *H04M 2250/22* (2013.01); *H04W 12/08* (2013.01)

(58) Field of Classification Search
CPC ......... H04W 4/18; H04W 4/80; H04W 12/08; H04L 65/4069; H04M 1/2472; H04M 2201/42; H04M 2250/02; H04M 2250/10; H04M 2250/22

USPC ...................................................... 455/414.1
See application file for complete search history.

(56) References Cited

U.S. PATENT DOCUMENTS

| | | | |
|---|---|---|---|
| 3,971,065 A | 7/1976 | Bayer | |
| 4,131,919 A | 12/1978 | Lloyd et al. | |
| (Continued) | | | |

FOREIGN PATENT DOCUMENTS

| | | |
|---|---|---|
| EP | 0651544 A3 | 5/1995 |
| EP | 1028569 A2 | 8/2000 |
| | (Continued) | |

OTHER PUBLICATIONS

Nokia 9110 User's Manual, 9357168 Issue 3 EN, © 1999 Nokia Mobile Phones.

*Primary Examiner* — Mong-Thuy T Tran
(74) *Attorney, Agent, or Firm* — Dickinson Wright PLLC

(57) ABSTRACT

A wireless communications device (WCD) includes an image processor operable to process information associated with digital images, a storage medium such as random access memory, flash memory, minidisk drive, etc. operable to store digital information associated with digital images. The WCD also includes a wireless communications module, such as a cellular modem, operable to wirelessly communicate with a network operable to communicate with wireless devices. For example, the wireless communications module may configure the information into a formate (i.e. CDMA, TDMA, GSM, etc.) such that the information may be wirelessly communicated to a network operable to receive image/information.

19 Claims, 9 Drawing Sheets

Related U.S. Application Data continuation of application No. 13/725,489, filed on Dec. 21, 2012, now Pat. No. 9,622,058, which is a continuation of application No. 09/874,423, filed on Jun. 4, 2001.

(60) Provisional application No. 60/208,895, filed on Jun. 2, 2000.

(56) References Cited

U.S. PATENT DOCUMENTS

| | | |
|---|---|---|
| 4,887,161 A | 12/1989 | Watanabe et al. |
| 5,016,107 A | 5/1991 | Sasson et al. |
| 5,088,070 A | 2/1992 | Shiff |
| 5,329,501 A | 7/1994 | Meister et al. |
| 5,340,978 A | 8/1994 | Rostoker et al. |
| 5,343,243 A | 8/1994 | Maeda |
| 5,404,580 A | 4/1995 | Simpson et al. |
| 5,414,444 A | 5/1995 | Britz |
| 5,475,441 A | 12/1995 | Parulski et al. |
| 5,491,507 A | 2/1996 | Umezawa et al. |
| 5,493,335 A | 2/1996 | Parulski et al. |
| 5,506,644 A | 4/1996 | Suzuki et al. |
| 5,526,411 A | 6/1996 | Krieter |
| 5,537,608 A | 7/1996 | Beatty et al. |
| 5,550,646 A | 8/1996 | Hassan et al. |
| 5,550,754 A | 8/1996 | McNelley et al. |
| 5,584,070 A | 12/1996 | Harris et al. |
| 5,671,451 A | 9/1997 | Takahashi et al. |
| 5,701,258 A | 12/1997 | Harris et al. |
| 5,717,787 A | 2/1998 | Feo et al. |
| 5,726,660 A | 3/1998 | Purdy et al. |
| 5,737,491 A | 4/1998 | Allen et al. |
| 5,760,824 A | 6/1998 | Hicks, III |
| 5,926,116 A | 7/1999 | Kitano et al. |
| 5,966,553 A | 10/1999 | Nishitani et al. |
| 5,983,229 A | 11/1999 | Houchin et al. |
| 5,999,525 A | 12/1999 | Krishnaswamy et al. |
| 6,020,982 A * | 2/2000 | Yamauchi ............ G11B 27/028 348/E9.01 |
| 6,031,497 A | 2/2000 | Nam |
| 6,038,295 A | 3/2000 | Mattes |
| 6,052,717 A | 4/2000 | Reynolds et al. |
| 6,058,417 A | 5/2000 | Hess et al. |
| 6,074,111 A | 6/2000 | Kasahara |
| 6,084,911 A | 7/2000 | Ishikawa |
| 6,118,456 A | 9/2000 | Cooper |
| 6,147,598 A | 11/2000 | Murphy et al. |
| 6,222,985 B1 | 4/2001 | Miyake |
| 6,259,405 B1 | 7/2001 | Stewart et al. |
| 6,269,446 B1 | 7/2001 | Schumacher et al. |
| 6,269,483 B1 | 7/2001 | Broussard |
| 6,272,521 B1 | 8/2001 | Jablonski et al. |
| 6,278,884 B1 | 8/2001 | Kim |
| 6,282,362 B1 | 8/2001 | Murphy et al. |
| 6,292,218 B1 | 9/2001 | Parulski et al. |
| 6,304,729 B2 | 10/2001 | Honda et al. |
| 6,317,776 B1 | 11/2001 | Broussard et al. |
| 6,321,158 B1 | 11/2001 | DeLorme et al. |
| 6,377,825 B1 | 4/2002 | Kennedy et al. |
| 6,389,457 B2 | 5/2002 | Lazaridis et al. |
| 6,415,320 B1 | 7/2002 | Hess et al. |
| 6,427,078 B1 | 7/2002 | Wilska et al. |
| 6,437,797 B1 | 8/2002 | Ota |
| 6,438,575 B1 | 8/2002 | Khan et al. |
| 6,466,917 B1 | 10/2002 | Goyal et al. |
| 6,507,365 B1 | 1/2003 | Nakamura et al. |
| 6,507,371 B1 | 1/2003 | Hashimoto et al. |
| 6,510,325 B1 | 1/2003 | Mack, II et al. |
| 6,522,889 B1 | 2/2003 | Aarnio |
| 6,525,768 B2 | 2/2003 | Obradovich |
| 6,535,243 B1 | 3/2003 | Tullis |
| 6,542,191 B1 | 4/2003 | Yonezawa |
| 6,549,770 B1 | 4/2003 | Marran |
| 6,559,882 B1 | 5/2003 | Kerchner |
| 6,560,443 B1 | 5/2003 | Vaisanen et al. |
| 6,567,122 B1 | 5/2003 | Anderson et al. |
| 6,571,246 B1 | 5/2003 | Anderson et al. |
| 6,573,927 B2 | 6/2003 | Parulski et al. |
| 6,628,325 B1 | 9/2003 | Steinberg et al. |
| 6,636,259 B1 | 10/2003 | Anderson et al. |
| 6,642,959 B1 | 11/2003 | Arai |
| 6,658,167 B1 | 12/2003 | Lee et al. |
| 6,665,772 B1 | 12/2003 | Hamlin |
| 6,677,858 B1 | 1/2004 | Faris et al. |
| 6,681,099 B1 | 1/2004 | Keranen et al. |
| 6,681,120 B1 | 1/2004 | Kim |
| 6,694,200 B1 | 2/2004 | Naim |
| 6,697,109 B1 | 2/2004 | Daly |
| 6,714,536 B1 | 3/2004 | Dowling |
| 6,715,003 B1 | 3/2004 | Safai |
| 6,732,161 B1 | 5/2004 | Hess et al. |
| 6,745,024 B1 | 6/2004 | DeJaco et al. |
| 6,754,484 B1 | 6/2004 | Hiltunen et al. |
| 6,762,791 B1 | 7/2004 | Schuetzle |
| 6,763,247 B1 | 7/2004 | Hollstrom et al. |
| 6,784,924 B2 | 8/2004 | Ward et al. |
| 6,788,332 B1 | 9/2004 | Cook |
| 6,831,754 B1 | 12/2004 | Delaney |
| 6,833,865 B1 | 12/2004 | Fuller et al. |
| 6,839,079 B2 | 1/2005 | Barlow et al. |
| 6,928,468 B2 | 8/2005 | Leermakers |
| 6,930,709 B1 | 8/2005 | Creamer et al. |
| 6,937,140 B1 | 8/2005 | Outslay et al. |
| 6,959,628 B2 * | 11/2005 | Macor ................ B25B 13/04 81/124.3 |
| 6,965,398 B2 | 11/2005 | Arakt |
| 6,967,675 B1 | 11/2005 | Ito et al. |
| 6,968,365 B2 | 11/2005 | Hollstrom et al. |
| 6,977,680 B1 | 12/2005 | Ichihara |
| 6,980,232 B2 | 12/2005 | Suzuki |
| 6,999,589 B2 | 2/2006 | Cato et al. |
| 7,007,076 B1 | 2/2006 | Hess et al. |
| 7,013,288 B1 | 3/2006 | Reifel et al. |
| 7,031,939 B1 | 4/2006 | Gallagher et al. |
| 7,043,048 B1 | 5/2006 | Ellingson |
| 7,058,036 B1 | 6/2006 | Yu et al. |
| 7,062,230 B1 | 6/2006 | Ishiguro et al. |
| 7,076,457 B2 | 7/2006 | Yamamoto et al. |
| 7,111,317 B1 | 9/2006 | McIntyre et al. |
| 7,139,916 B2 | 11/2006 | Billingsley et al. |
| 7,173,651 B1 | 2/2007 | Knowles |
| 7,187,947 B1 | 3/2007 | White et al. |
| 7,200,566 B1 | 4/2007 | Moore et al. |
| 7,210,161 B2 | 4/2007 | Ward et al. |
| 7,231,367 B1 | 6/2007 | Alfvin et al. |
| 7,249,094 B2 | 7/2007 | Levchin et al. |
| 7,266,522 B2 | 9/2007 | Dutta et al. |
| 7,310,610 B2 | 12/2007 | Fujita et al. |
| 7,348,961 B1 | 3/2008 | Shneidman |
| 7,353,251 B1 | 4/2008 | Balakrishnan |
| 7,418,483 B2 | 8/2008 | Hess et al. |
| 7,478,055 B2 | 1/2009 | Goino |
| 7,480,638 B1 | 1/2009 | Sze |
| 7,483,856 B2 | 1/2009 | Likourezos et al. |
| 7,486,628 B1 | 2/2009 | Brisebois et al. |
| 7,499,979 B2 | 3/2009 | Hess et al. |
| 7,505,935 B2 | 3/2009 | Mendiola et al. |
| 7,542,943 B2 | 6/2009 | Caplan et al. |
| 7,701,490 B2 | 4/2010 | Ward et al. |
| 7,739,407 B1 | 6/2010 | Pakkala |
| 7,742,084 B2 | 6/2010 | Ward et al. |
| 7,742,985 B1 | 6/2010 | Digrigoli et al. |
| 7,765,141 B1 | 7/2010 | Innocenti |
| 7,770,209 B2 | 8/2010 | Billingsley et al. |
| 7,890,386 B1 | 2/2011 | Reber |
| 7,921,040 B2 | 4/2011 | Reber |
| 7,933,811 B2 | 4/2011 | Reber |
| 7,936,391 B2 | 5/2011 | Ward et al. |
| 8,200,538 B2 | 6/2012 | Reber |
| 8,200,541 B2 | 6/2012 | Reber |
| 8,200,542 B2 | 6/2012 | Reber |
| 8,204,792 B2 | 6/2012 | Reber |
| 8,209,231 B2 | 6/2012 | Reber |

(56) References Cited

U.S. PATENT DOCUMENTS

| | | |
|---|---|---|
| 8,209,233 B2 | 6/2012 | Reber |
| 2001/0012000 A1 | 8/2001 | Eberhard |
| 2001/0013890 A1 | 8/2001 | Narayanaswami |
| 2001/0032335 A1* | 10/2001 | Jones .................. H04L 29/06 |
| | | 725/105 |
| 2001/0049636 A1 | 12/2001 | Hudda et al. |
| 2001/0051910 A1 | 12/2001 | Snelgrove et al. |
| 2002/0010675 A1 | 1/2002 | Offer |
| 2002/0030745 A1 | 3/2002 | Squilla et al. |
| 2002/0065728 A1 | 5/2002 | Ogasawara |
| 2002/0105588 A1 | 8/2002 | Nishimura |
| 2002/0191029 A1 | 12/2002 | Gillespie et al. |
| 2003/0030839 A1* | 2/2003 | Walters .............. H04N 1/00244 |
| | | 358/1.15 |
| 2003/0041110 A1 | 2/2003 | Wenocur et al. |
| 2003/0065805 A1 | 4/2003 | Barnes, Jr. |
| 2003/0142215 A1 | 7/2003 | Ward et al. |
| 2005/0146609 A1* | 7/2005 | Creamer ............ H04N 1/00214 |
| | | 348/207.1 |
| 2005/0246752 A1* | 11/2005 | Liwerant ................ G06Q 30/02 |
| | | 725/109 |

FOREIGN PATENT DOCUMENTS

| | | |
|---|---|---|
| JP | H05122574 A | 5/1993 |
| JP | H6268582 A | 9/1994 |
| WO | WO9214329 A1 | 8/1992 |
| WO | WO9952259 A1 | 10/1999 |

\* cited by examiner

APPARATUS, SYSTEM, METHODS AND NETWORK FOR COMMUNICATING INFORMATION ASSOCIATED WITH DIGITAL IMAGES

CROSS-REFERENCE TO RELATED APPLICATIONS

This application is a continuation of U.S. patent application Ser. No. 15/483,073, filed Apr. 10, 2017, which is a continuation of U.S. patent application Ser. No. 13/725,489, filed Dec. 21, 2012, now U.S. Pat. No. 9,622,058, which is a continuation of U.S. patent application Ser. No. 09/874,423, filed Jun. 4, 2001, which claims the benefit of U.S. Provisional Patent Application No. 60/208,895 filed Jun. 2, 2000, the disclosures of which are hereby expressly incorporated by reference in their entirety.

FIELD OF THE DISCLOSURE

The present disclosure generally relates to communicating information, and more particularly, to an apparatus, system, methods and network for communicating information associated with digital images.

BACKGROUND

Advancements in photography have brought about a need for novel methods for processing digital images. The digital camera, though in its infancy, may nearly replace conventional imaging techniques as advancements in digital imagery proliferate. The development of digital photography includes creating high quality single shot images using a CCD (Charge-Coupled Device) chip which houses thousands of "sensors" sensitive for red, green and blue light. Via interpolation, a built-in or external computer recalculates the original color of each pixel.

A large problem to overcome for camera designers is the resolution of the CCD. More "sensors" mean higher resolutions, but it's technically difficult to create CCD chips with larger surfaces (larger "negative" format) with more "sensors". The last few years have brought a breakthrough and resolution is becoming acceptable for professional use. Modern CCD's on 6×6 cm "neg." format are housing up to 6,000,000 pixels, enough for A4 output.

During use, light passes through the lens of a digital camera the same way it does a regular camera. Instead of being focused on photographic film, the image is focused on a chip called a charge-coupled device (CCD). The top of the CCD is covered with transistors that create electrical currents in proportion to the intensity of the light striking them. The transistors make up the pixels of the image. A pixel is the minimum, distinct visual piece of information that a component can display or capture. The pixel can be made up of only one transistor for black and white photography or several transistors for color. The more pixels in an image, the better the resolution. The transistors create a continuous, analog electrical signal that goes to an analog-to-digital converter—(ADC). The ADC is a chip that translates the varying signal to a digital format, which consists of a continuous stream of 1's and 0's.

The ADC sends the digital information to a digital signal processor (DSP)-that has been programmed specifically to create photographic images. The DSP adjusts the contrast and detail in the image, compresses the data that makes up the image so that it takes up less storage space, and sends the data to the camera's storage medium.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The conceptual groundwork for the present invention involves communicating information associated with digital images between at least one device and at least one network. According to one aspect of the invention, information may be communicated by a device operable to communicate information associated with digital images to a network such as the Internet. A device may include a communications module, such as a communications modem, operable to communicate information between the device and a network. In one embodiment, the device may communicate with a network location, such as a website, to communicate information associated with digital images. As such, a user may allow for a network location to process communicated information associated with digital images.

In a particularized form, the device may include a wireless communications module or modem operable to communicate information via a wireless communication network. The wireless communication network may then communicate the information associated with digital images to a desirable network location such as a homepage, an image processing center, an email account, an Internet address, etc. As such, the present invention advantageously allows a user to wirelessly communicate information associated with a digital images from a device to a desirable network location.

In an exemplary form, a user may capture images using a device comprised of a digital camera and a wireless communications modem and format information associated with an image such that the images may be wirelessly communicated via a network operable to communicate with the device. As such, a user may process digital images and wirelessly communicate information associated with the digital images to a wireless network operable to receive the communicated information. The information may then be communicated to a network location or address operable to process the information representing the digital images. In one embodiment, the information may then be used to print or process the digital images as conventional "photographs" if desired. In this manner, a user may have the processed images delivered to a user selected location such as a home, place of business, etc. As such, a user may efficiently capture digital images via a wireless communication network allowing a user to capture images and receive images in a desirable format to various locations with minimal user interaction.

Figure 1:
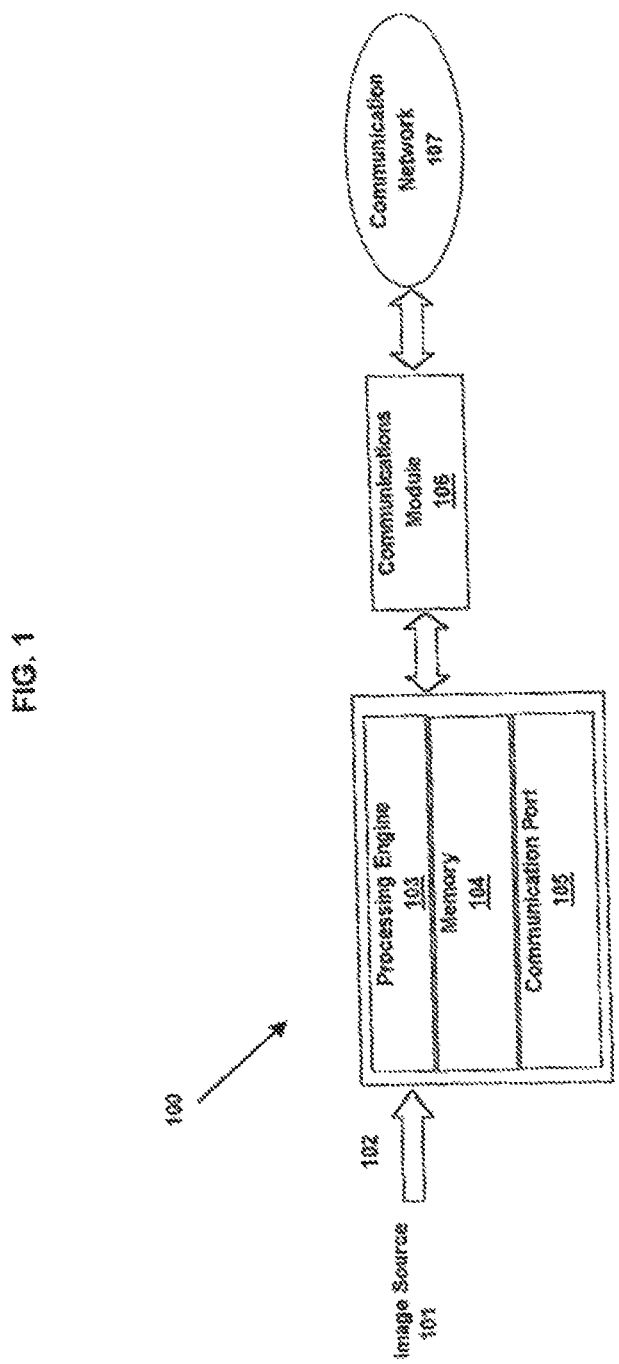
FIG. 1 illustrates a diagram of a device for communicating information associated with digital images according to one aspect of the invention.

FIG. 1 illustrates a diagram of a device for communicating information associated with digital images according to one aspect of the invention. An electronic device, illustrated generally at 100, includes a processing engine 103 operable to process information associated with digital images, a memory 104 operable to store information associated with digital images and a communication port 105 operable to receive and transmit information. Device 100 may include a communications module 106 for communicating information to a communication network 107 such as a global communication network, the Internet, an Intranet, a wireless communication network, etc. Communications module 106 may be further operable to communicate information to a desktop computer or client terminal operable to receive and transmit information. As such, communications module 106 may be configured as a series, parallel, and/or seriesparallel communication device operable to communicate information and may employ several different types of communication protocols. For example, communications module may include a wireless or wireline modem operable to transfer information between device 100 and network 107. In another embodiment, communications module 106 may be removably coupled to device 100 for periodically communicating information between device 100 and a communication network, desktop computer, portable computer, or other electronic devices.

Communication of information may be initiated automatically upon device 100 processing information associated with digital images or by a user selecting one or more keys or buttons (not expressly shown) operably associated with communications module 106, device 100 and/or image source 101. For example, device 100 may communicate information upon a user selecting a capture button (not expressly shown) associated with recording a digital image and transfer image information via communications module 106 to communication network 107. As such, one-touch processing of digital images and associated information may be employed. In a similar manner, a series of images and associated information stored within memory 104 may be communicated with a single touch of a button associated with image source 101, device 100 or communications module 106. In this manner, a series of images and associated information may be processed and transferred to a desktop computer system, network, etc. with a single touch of a button.

During use, device 100 may receive digital image information via input port 102 and process the information such that the information may be communicated via communications module 106. For example, device 100 may be coupled to an image source such as a digital camera having a communication port operable to communicate information associated with the digital images. One example of a communication port may include a Universal Serial Bus (USB) port operable to serially communicate information via a USB. USB communication ports and USB protocols are well known in the art. Digital information may be communicated to device 100 and information may be formatted into a format operable to be communicated using communications module 106. For example, information associated with digital images may be formatted, as required, into a format operable to be communicated to a network using communications module 106 operable as a-modem such as a 56k flex modem. Processing engine 103 may format image information based on several different processing characteristics and desired processes as described below.

In another embodiment, device 100 may receive information from a conventional digital camera, process information into a communicable format, and communicate information to a network, such as the Internet.

In one embodiment, device 100 may be integrated into a digital camera operable to record digital images. As such, the digital camera including device 100 provides an integrated system that advantageously provides a digital camera communication system operable to communicate with a network such as the Internet for processing digital images.

Figure 2:
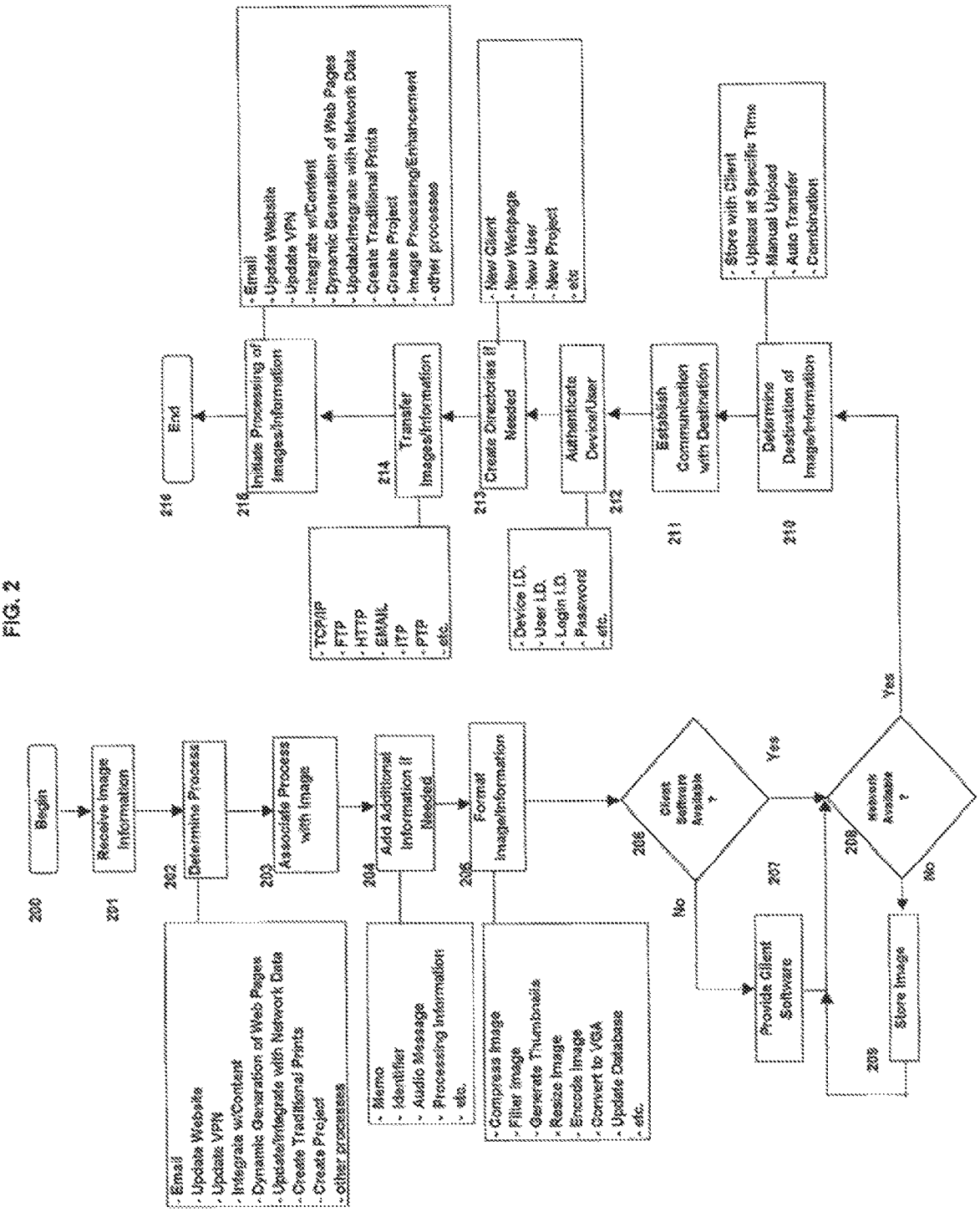
FIG. 2 illustrates a method for communicating information associated with digital images to a network according to one aspect of the invention.

FIG. 2 illustrates a method for communicating information associated with digital images to a network according to one aspect of the invention. The method may be employed within a program of instructions embodied within a computer readable medium, a memory device, encoded logic, or other devices or systems operable to use a portion or all of the method illustrated in FIG. 2.

The method begins generally at step 200 and may be well suited for use in association with electronic device 100 illustrated in FIG. 1 or other electronic devices or systems. At step 201 information associated with a digital image is received and an associated process is determined at step 202. For example, one or more processes may be employed for processing a digital image and may include sending an email, updating a web site, updating a virtual private network, integrating content with one or more databases, dynamic generation of a website and/or web pages, updating/Integrating with network data, creating traditional prints, creating projects, or other processes operable to employ digital image information. As such, deterministic processing of information may be associated with a digital image 203 and additional information may be added if needed at step 204. For example, a user may include a memo in association with a digital image, add an identifier to identify a digital image, and/or provide a recorded audio message to be provide in association with a digital image. Processing information operable to identify a determined process may also be provided for identifying an associated process.

The method then proceeds to step 205 and formats image and/or image information based on a determined process associated with a digital image. Additional processing may include, but is not limited to, compressing an image, filtering an image, generating thumbnails, flagging an image for subsequent thumbnail generation, resizing an image, converting an image to a different format such as VGA, black and white, grayscale, etc. and/or updating a database associated with a digital image. The method may also encode processing information and/or destination information associated with a digital image as a part of the digital image thereby providing a digital image having process information. For example, a digital image may be encoded to include process information and/or destination information within a portion of a digital image, such as a header, operable to uniquely identify a process for processing a digital image. In this manner, digital image/information may be communicated to a destination and translated to determine an associated process to employ for processing a digital image/information. In one embodiment, deterministic processing may be encoded within the name or title of the digital image. For example, a series of characters may be include as a part of the image name for determining a process to be employed upon communicating information associated with a digital image to a destination.

Upon formatting an image/information, the method proceeds to step 206 where the method determines if software is available for communicating information. For example, a digital camera may be coupled to one or more different communication modules for communicating information associated with digital images. As such, a client device such as a computer system, communication module, modem, etc. may not include software such as a program, driver, etc. operable to allow image information to be communicated to a computer and/or network location. As such, the method proceeds to step 207 and may provide client software operable to enable communication of image/information. For example, a temporary program may be copied to a client operable to communicate image information to a destination and upon completing transferring information may remove/delete itself from the system. In this manner, a program unique to an electronic device may be temporarily used with one or more systems thereby providing a client independent platform for communicating image/information.

Upon determining if client software is available, at step 208, the method determines if a network is available for communicating image/information. If a network is not available, the method proceeds to step 209, and image/information may be stored locally on the device, within memory associated with a desktop computer, electronic device, etc. or transferred to other storage mediums.

Upon a network becoming available, the method proceeds to determine a destination for image/information at step 210. For example, image/information may be stored locally with a client, uploaded to a destination at a specific time, manually uploaded by a user, automatically communicated or other combinations for communicating image/information. In one embodiment, an image may include destination and/or processing information as a portion of the image information. As such, the method may read a portion of the image (i.e. header, etc.) and determine one or more destinations for communicating the images/information. For example, a network location such as a website/network address, may be encoded as a part of the image and accessed to determine a destination for a image/information. In another embodiment, information may be provided in association with a digital image for identifying a destination for the digital image. For example, a file may be accessed to determine a destination for a specific image name thereby providing a destination for the digital image. As such, a file may include assorted information for one or more digital images and may be accessed to determine network locations and processing associated with each image. For example, a file may include an image name, one or more processing destinations for the image/information, processing associated with each image/information at a selected destination, the source providing the image, a user I.D. a Login I.D—passwords, image format information, etc. operable to be used in providing deterministic processing of image/information, etc. A digital image may further include information internal to the image file and the method may access the information to determine one or more destinations.

Upon determining a destination, the method proceeds to step 211 and establishes communication with the one or more destinations for the image/information and, at step 212, may authenticate a device/user prior to allowing transferring of image/information. Upon authenticating a device/user, the method proceeds to step 213 where the method may create one or more directories for storing the images if needed and to step 214 where images/information are transferred based on one or more transfer protocols. The method then proceeds to step 215 and proceeds to process images based on processing information provided in an association with an image/information, after which the method ends at step 216. The method of FIG. 2 may be initiated via a client, device, image capturing device, etc. operable to initiate processing of images/information. Additionally, portions or all of the method of FIG. 2 may be used to process one or more images, as a batch process, and/or may be automatically employed within an electronic device, image capturing device, desktop computer, client, network, etc. operable to use the method of FIG. 2.

Figure 3:
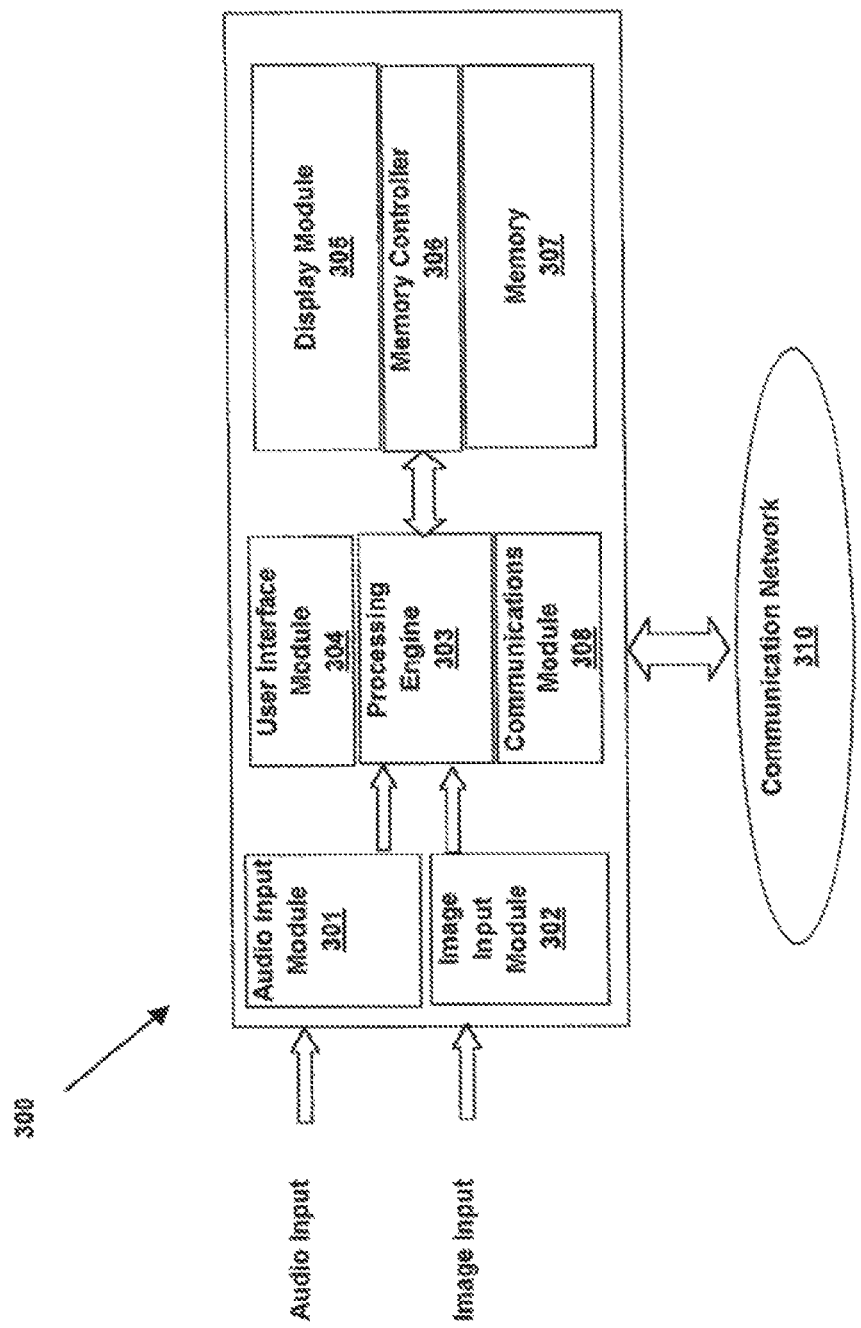
FIG. 3 illustrates a device operable to wirelessly communicate information associated with digital images according to one aspect of the invention.

FIG. 3 illustrates a device operable to wirelessly communicate information associated with digital, images according to one aspect of the invention. A wireless communications device (WCD), illustrated generally at 300, includes an image input module 302 operable to provide information associated with digital images, a memory device 307 such as random access memory, flash memory, minidisk drive, etc. operable to store information associated with digital images and an associated memory controller 306. WCD 300 may further include an audio input module 301 operable to receive an audio signal or file. A user interface module 304 is provided for enabling user interaction with WCD 300 and a display module 305 may be used to display images/information to a user. WCD 300 also includes a communications module 308 operable to communicate with one or more networks such as a wireless/wireline network. For example, communications module 308 may be operable to communicate information via a format (i.e. CDMA, T.DMA, GSM, etc.) such that: the information may be wirelessly communicated to a network operable to receive the information or via conventional TCP/IP for wireline communication WCD 300 includes a processing engine 303 operable to provide deterministic processing information for images and associated information. WCD 300 may also include one or more processors operable to process image information. For example, WCD 300 may include an image processor (not expressly shown) operable to record digital and a communication processor operable to communicate image information and associated process information. The processors may be integrated as a single chip or as a "system-on-a-chip" for communicating image information having associated process information.

In one embodiment, communications module 308 for the digital camera may include a code division multiple access and advanced mobile phone system (CDMA/PCS/AMPS) cellular technology for wirelessly communicated digital information. Qualcomm's Mobile Station Modem (MSM™) chipset and system software may include a MSM3300 single-chip baseband processor modem that interfaces directly with the IFR3300™, RFR3100™ and RFT3100"* chips, and the PM1000™ power management chip. The MSM3300 chipset and system software may include advanced technologies such as global position location and Bluetooth, as well as multimedia features such as Qtunes™ MP3 player software and Compact Media'Extension (CMX™) MIDI based multimedia software. The MSM3300 device integrates both digital and analog functions on a single chip. The low-power, low-cost MSM3300 includes ari.ARMPTDMI'1** RISC microprocessor, and Qualcomm's powerful QDSP2000™ digital signal processor core.

The MSM3300 and associated chipset includes a MSM3300 modem, a RFT3100 analog-baseband-to-RF upconverter, a IFR3300 IF-to-baseband downconverter, a RFR3100 RF-to-IF downconverter and a PM1000 power management ASIC. During use, the MSM3300 performs baseband digital signal processing and executes the subscriber unit system software and serves as the central interface device in the subscriber unit, connecting RF and baseband circuits as well as memory and user interface features. The MSM3300 device also includes complete digital modulation and demodulation systems for both CDMA and AMPS cellular standards as specified in IS-95A and IS-95B. Processing engine 303 may include an embedded microprocessor within the MSM3300 device.

WCD 300 may further include global positioning capabilities for providing location information of WCD 300— One such technology may include Qualcomm's gpsOne™ Technology which may be associated with the MSM3300 Chipset. The gpsOne position location technology merges Global Positioning System (GPS) satellite and network information* WCD 300 utilizing a GPS module such as gpsOne collects measurements from a GPS constellation and a cellular/PCS network and sends the information to the Position Determination Entity which optimizes the position location calculation based on existing information.

WCD 300 may also include a Bluetooth wireless communication module. Bluetooth is a Global Specification for Wireless Connectivity and allows replacement of various cables that connect one device to another using a universal short-range radio link. For example, Bluetooth radio technology built into both a <t cellular telephone and a laptop would replace the cumbersome cable used today to connect a laptop to a cellular telephone. Printers, PDAs, desktops, fax machines, keyboards, joysticks and virtually any other digital device can be part of the Bluetooth system. In addition to untethering devices by replacing the cables, Bluetooth radio technology provides a universal bridge to existing data networks, a peripheral interface, and a mechanism to form small, private ad hoc groupings of connected devices away from fixed network infrastructures. The Bluetooth air interface is a frequency-hopping Gaussian Frequency Shift Keying (GFSK) modulation in the unlicensed 2.4 GHz ISM band. The modulation rate is IMbps, and its architecture offers a low-cost, simple radio solution. The Bluetooth baseband functionality may be incorporated as a part of WCD 300 and may also be operable to facilitate dial-up networking via an external communications module (not expressly shown) such as a wireless hub operable to communicated with a global network such as the Internet.

Communication module 308 may also include Universal Serial Bus (USB) for faster data transfers between WCD 300 and a device or network. Communication module 308 may also provide both an Internet Protocol (IP) stack support and Wireless Application Protocol (WAP) support operable to provide network independent Internet connectivity.

WCD 300 may also include Digital CMOS Image (DCI) sensor (not expressly shown) for image capture and a Color Liquid Crystal Display (LCD) driver to allow viewing of both still and moving images in full color.

During use, WCD 300 may be operable as a digital camera and may record images in a digital format process images using processing engine 303 for providing process information and communicating images/information using one or more networks. As such, a user may utilize WCD 300 without having to connect WCD 300 to a landline or hard wire operable to communicate with a network such as the Internet. Through providing WCD 300 comprised of a digital camera, a user may digitally record images and wirelessly communicate digital images advantageously reducing processing time while increasing efficiency and flexibility for processing digital images.

In one embodiment, WCD 300 may be operable as a device similar to a disposable camera. For example, a user may purchase WCD 300 comprised of a digital camera and having a predetermined number of digital exposures. A user may then use WCD 300 (e.g. record digital images) and wirelessly communicate information associated with digital images to a network operable to receive image information. A user may then use WCD 300 until all of the available exposures have been used in a similar manner to utilizing all available exposures within a disposable camera. Upon using all of the available exposures, a user may then contact a vendor (i.e. phone, Internet, etc.) and request and/or purchase additional exposures for WCD 300. The vendor may then configure WCD 300 for a desirable number of exposures. For example, the vendor may wirelessly communicate with WCD 300 and reconfigure/reprogram WCD 300 for additional exposures. In this manner, a user may purchase various amounts of digital exposures as needed without having to return WCD 300 to a vendor or purchase an additional WCD 300. In another embodiment, a user may return WCD 300 to the vendor or a representative and have the vendor reconfigure WCD 300 for additional exposures.

In another embodiment, exposures may be provided or accessed via a server or network location. For example, a processing center (not expressly shown) may be operable to determine the number of exposures available for WCD 300. As such, the processing center may determine the availability of exposures for WCD 300 and enable communication based upon the number of available exposures. For example, the processing center may allow wireless communication of from WCD 300 if a user has prepaid or provided for access. Upon the number of exposure being used, wireless communication may be terminated until the user "buys" additional access or exposures.

In another embodiment, WCD 300 may allow a user to wirelessly communicate digital information to a network for an access fee. In a similar manner to conventional cellular phones or long distance carriers, a user may utilize WCD 300 via a "pay-as-yougo" contract plan allowing a user to pay a monthly fee, or a fee for the number of images (i.e. size of files communicated, amount of time, etc.) communicated by WCD 300 to communications network 310.

In another embodiment, WCD 300 may be operable to be coupled to a communications port of a conventional portable electronic device such as a digital camera or digital video recorder. As such, WCD 300 may receive information communicated from the digital camera or digital video recorder and wirelessly communicate information to communication network 310 operable to communicate wireless information. For example, WCD 300 may be coupled to a digital video recorder via a communications port. The WCD may then receive information from the digital video recorder and process information representing the recorded digital video imagery into a format that may be wirelessly communicated. Upon formatting the information, WCD 300 may communicate information to a network operable to receive the wirelessly communicated information.

For example, a user may want to wirelessly communicate streaming video or a video file associated with a wedding. As such, a user may record video and audio and wirelessly communicate information to a network operable to receive wirelessly communicate information representing a digital recording of the wedding. Information may then be processed such that a user may access the information. For example, information may be wirelessly communicated to a network and processed into a format such that a user may access a network location operable to communicate information associated with the wedding. In this manner, an individual that may not have been able to attend a wedding may receive the wirelessly communicated representing the wedding at a network location using a device operable to receive the information representing the wedding. In one embodiment, a website may provide a user access to the wirelessly communicated information. As such, the website may provide access to the event in a "virtual" manner without the user having to be physically present at the wedding. Therefore, a user may purchase WCD 300 as a retrofit for a digital recorder. However, in other embodiments, WCD 300 may comprise a digital video recorder.

Figure 4:
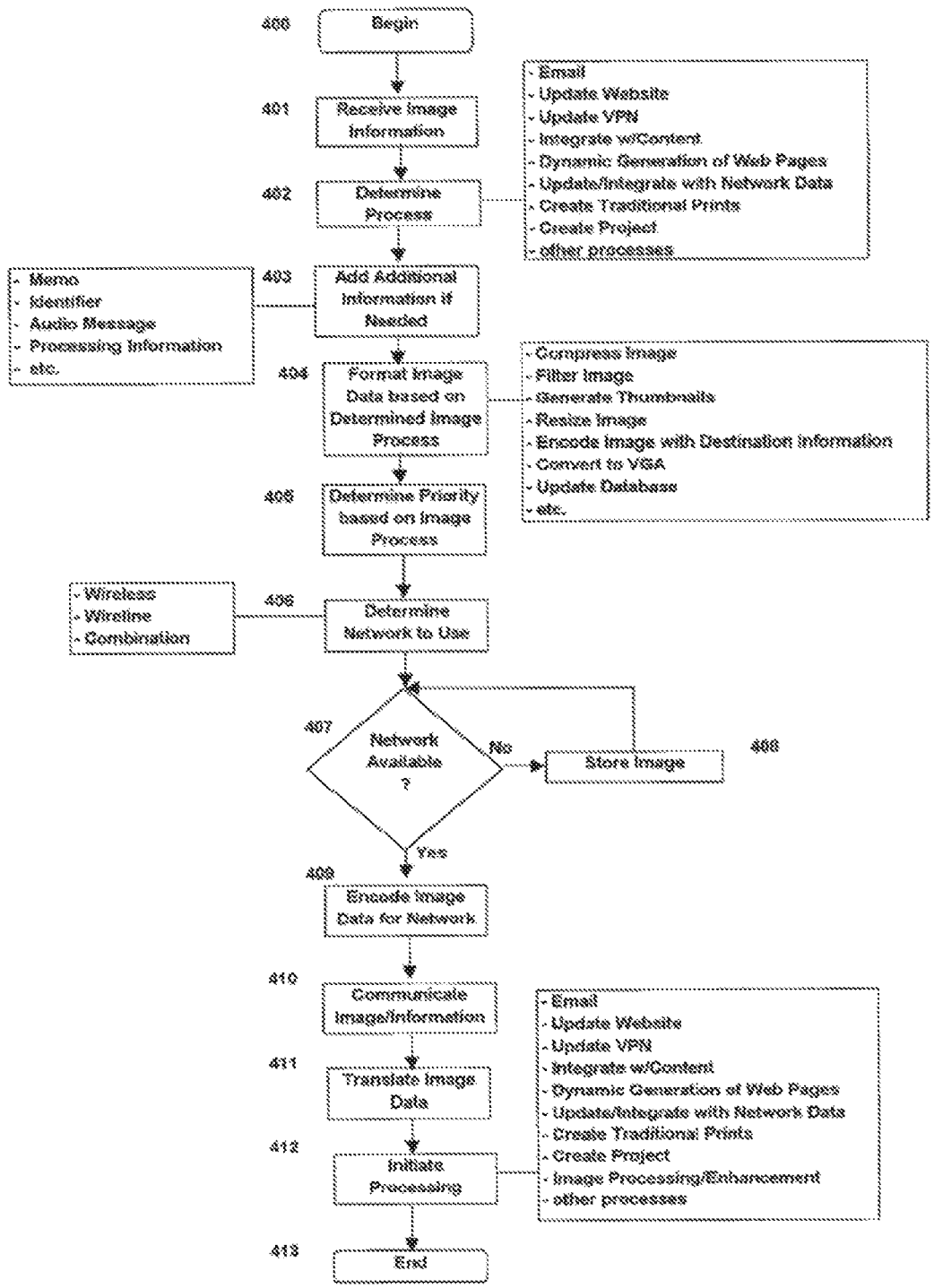
FIG. 4 illustrates a method for wirelessly communicating information associated with digital images according to one aspect of the invention.

FIG. 4 illustrates a method for wirelessly communicating information associated with digital images according to one aspect of the invention. The method may be employed within a program of instructions embodied within a computer readable medium, a memory device, encoded logic, or other devices or systems operable to use a portion or all of the method illustrated in FIG. 4.

The method begins generally at step 400. At step 401 information associated with a digital image is received and an associated process is determined at step 402. For example, one or more processes may be employed for processing a digital image and may include sending an email, updating a website, updating a virtual private network, integrating with content or one or more databases, dynamic generation of a web site and/or web pages, updating/Integrating with network data, creating traditional prints, creating projects, or other processes operable to employ digital image information. As such, deterministic processing of information may be associated with a digital image and additional information may be added if needed at step 403. For example, a user may include a memo in association with a digital image, add an identifier to identify a digital image, and/or provide a recorded audio message to be provide in association with a digital image. Processing information operable to identify a determined process may also be provided for identifying an associated process.

The method then proceeds to step 404 and formats image and/or image information based on a determined process associated with a digital image. Additional processing may include, but is not limited to, compressing an image, filtering an image, generating thumbnails, flagging an image for subsequent thumbnail generation, resizing an image, converting an image to a different format such as VGA, black and white, grayscale, etc. and/or updating a database associated with a digital image. The method may also encode processing information and/or destination information associated with a digital image as a part of the digital image thereby providing a digital image having process information. For example, a digital image may be encoded to include process information and/or destination information within a portion of a digital image, such as a header, operable to uniquely identify a process for processing a digital image. In this manner, digital image/information may be communicated to a destination and translated to determine an associated process to employ for processing a digital image. In one embodiment, deterministic processing may be encoded within the name or title of the digital image. For example, a series of characters may be include as a part of the image name for determining a process to be employed upon communicating information associated with a digital image to one or more destinations.

The method then proceeds to step 405 and determines a priority based on an associated process. For example, image information that must be communicated without delay would include a high priority and image information that is not time sensitive would include a lower priority. Priority may be used to determine if a wireless network should be used to communicate an image/information or if a wireline network should be used. Additionally, priority for communicating an image may be altered based on the amount of storage capacity available for a device. For example, as capacity decreases a priority for an image may be altered thereby queuing an image for wireless communication. Other priorities may also be used to establish a type of communication to use for communicating image information. For example, an image may include a low priority and as such would not need to be communicated in whole via a wireless network. As such, an image may be segmented and at periodic times into portions of an image having associated identifying properties and may be wirelessly communicated to a destination. As such, a balancing out of network loading may be maintained for communicating voluminous image information.

Upon determining a priority, the method proceeds to step 406 where the method determines what network to use for communicating image information. For example, an image/information may be selected for wireless communication while one or more other images may not be selected for wireless communicating. As such, an image/information may be communicated to a network via an appropriate communication network. Upon determining which network to use, the method proceeds to step 407 and determines if a network is available. If the network is not available the method proceeds to step 408 and stores image/information within memory until a network is available. If the network is available, the method proceeds to step 409 and encodes the image/information for communication and communicates the image/information at step 410. Upon communicating the image/information, the method proceeds to step 411 and translates the communicated image information and to step 412 to initiate a process associated with the communicated image/information. The method then proceeds to step 413 where the method ends.

In one embodiment, the method may process the information such that conventional photographs are provided using the communicated image/information. Additionally, the photographs may be forwarded to a physical location such as the user's home address, business address, designated address, etc. In another embodiment, the information may be stored at a network location for future processing.

In another embodiment, the images/information may be forwarded as an email to an email address operable to receive the information. In another embodiment, the information may be stored at a network location operable to allow a user to select which digital images should be processed. As such, a user may communicate various numbers of photos to a network location and process the photos as desired.

In one embodiment, a pull (or push) technology associated with wireless communication may be employed for communicating image/information. Pull technology is a type of wireless communication that does not require persistent two-way wireless communication for communicating information. For example, a wireless device may establish a one-way communication thereby reducing the amount of overhead associated with establishing a two-way communication protocol.

In one embodiment, the method may be used to establish communication between a network and a device. For example, communication may be initiated by a device by applying power to the device. As such, a transceiver associated with the device may communication with the network and establish a communication link.

Figure 5:
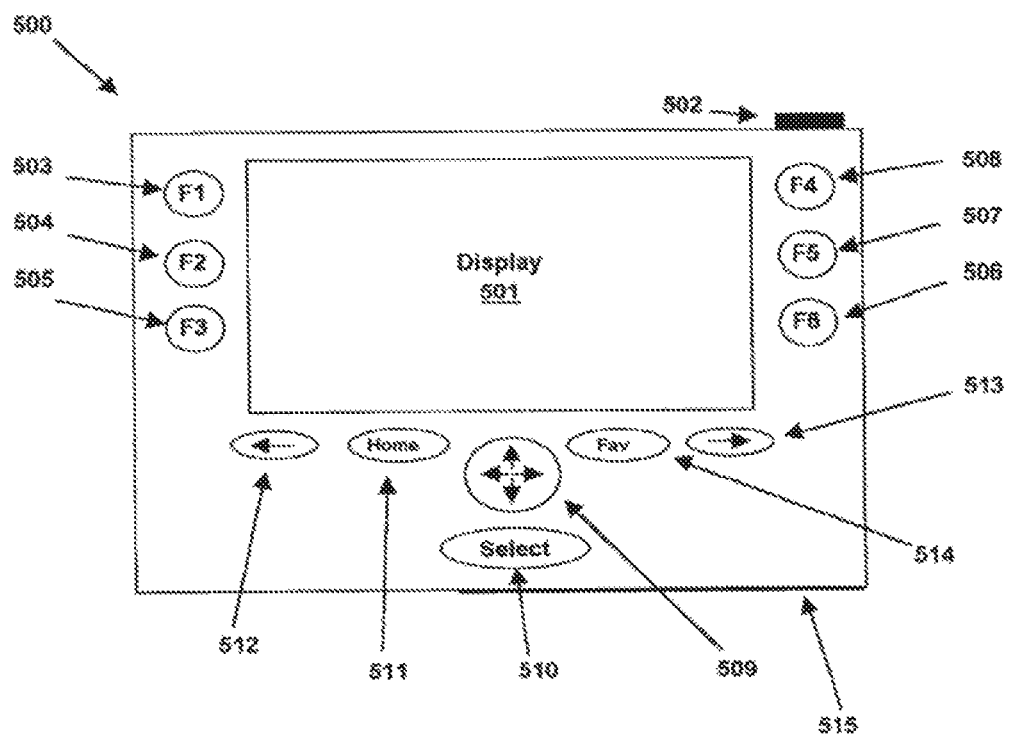
FIG. 5 illustrates—a wireless communication system operable to wirelessly communicate information associated with image information according to one embodiment of the invention.

FIG. 5 illustrates a wireless communication system operable to wirelessly communicate information associated with image information according to one embodiment of the invention. Wireless communication system (WCS) 500 includes a display 501 such as an active matrix, LCD, touch screen and the like operable to display information, input device such as a pointing device 509, selection button 510 and browser buttons such as home button 511, back button 512, favorite button 514 and forward button 513. WCS 500 further includes several other function button (F1-F6) 503, 504, 505, 506, 507, 508 operable to be using in association with WCS 500. For example, one or more buttons 503, 504, 505, 506, 507, 508 may be programmed/re-programmed for functions such as magnification of a captured image, communication functions for initiating communication of image/information, email function for emailing image information, and other functions that may be used in association with processing, manipulating, etc. images/information.

WCS 500 further includes a communications module operable as a wireless communications module (not expressly shown) that may wirelessly communicate information to a network operable to communicate with WCS 500. For example, a communications module may be operable to wirelessly communicate information using one or more types of wireless communication.

A user may wirelessly communicate with a network such as the Internet using WCS 500 operable to receive and communicate wireless information providing access to the Internet. Such communications may include using a WAP operable to wirelessly communicate information associated with the Internet. A browser may be provided with WCS 500 allowing a user may navigate using forward button 513, back button 512, home button 511, favorite button 514, etc. operable to allow a user to navigate the Internet.

WCS 500 may further include software and hardware operable to allow a user to browse the Internet and access selective information in a desirable manner. For example, a user may access a website operable to receive information representing digital images. A user may preview an image and communicate a desired image to a website operable to receive information representing the recorded images. In this manner, a user may communicate information (i.e. print photos, request photo processing, email information, etc.) without having to access the Internet via a computer or hard-line, landline, etc.

In one embodiment, WCS 500 may be programmed or re-programmed for additional/updated functionality. For example, a new service or information associated with a current or existing service, may be wirelessly communicated to WCS 500 and stored within memory associated with WCS 500. In this manner, WCS 500 may be remotely reprogrammed expanding/updating the functionality of WCS 500 thereby enabling WCS 500 to be configured and/or re-configured as needed.

In one embodiment, a service request may be communicated to a network for processing via a land-line, wire-line, etc. using a communication module operably associated with WCS 500. For example, wireless service may not be available for communicating with a network. As such, WCS 500 may be operable to communicate in a client-server based mode for requesting, processing, uploading image information, accessing the Internet, etc.

In one embodiment, a user may capture an image and preview an image using display 501. An image may be stored within memory associated with WCS 500 and displayed upon a user selecting a preview button 502. A user may record a plurality of images and preview the images by selecting a preview button 502. As such, a user may use the browser buttons 511-514 to navigate recorded images in a similar manner to navigating a network such as the Internet. For example, a user may select forward button 513 or back button 512 to navigate images. In one embodiment, a user may return to a first image by selecting home button 511. A user may also select favorite button 514 to "mark" an image to be saved or wirelessly communicated. In this manner, a user may wirelessly communicate selected images, to desirable network locations. Through wirelessly communicating information, access can "free up" memory within WCS 500.

In another embodiment, WCS 500 may wirelessly communicate information associated with a digital image to an email address. For example, a user may record a digital image and wirelessly communicate information comprised of the digital image to one or more email addresses. For example, WCS 500 may be operable to access a mail list comprised of one or more email addresses. As such, a user may select an email function and wirelessly communicate information associated with the digital image to a network operable to receive the wirelessly communicated information. The email may then be communicated to a desirable email address selected by the WCS user. For example, a user may want to email a photo of the Grand Canyon to his or her parents while the user is on vacation. The user, lacking assess to a land-line while at the Grand Canyon, can email a digitally recorded image to a desirable email address for his or her parents by selecting WCS's 500 email function operable to send an email to a desirable email address. In this manner, a user can send a "digital postcard" to one or more email addresses.

In another embodiment, a user may input an email address utilizing an input device such as a graphical keyboard, a digital notepad, and/or scribe 515 similar to a Palm device, or other input devices configurable to allow a user to input a desirable email address. As such, a user may input an email address and/or a message. A user may then use WCS 500 compose and communicate an email comprised of the digital photograph to an email address. Display 501 may be operable as a touch screen allowing a user to select function, such as soft keys, access and input/provide information, etc. in a similar manner to a Palm device.

In another embodiment, a user may access a list of email addresses stored accessible by WCS 500. In another embodiment, a user may access an Internet email account for emailing digital images. Other embodiments may include providing a user access to address list via the Internet. As such, a user may access email addresses in a plurality of ways for wirelessly communicating information to an email address.

In another embodiment, WCS 500 may include an audio input port (not expressly shown) operable to receive an audio input. User may use WCS 500 to record a digital audio file allowing a user to wirelessly communicate an audio file in association with digital image information. As such, a user may record a digital image using WCS 500 and further record an audio file to be associated with the captured image.

A user may then wirelessly communicate the information to a network. For example, a user may email a digital photo and provide an audio file associated with the digital photo to a selected email account. For example, a user may want to record an audio message such as "Hello from the Grand Canyon" and provide a digital photo of the Grand Canyon in association with the recorded message. In this manner, a user may wirelessly communicate an email having a digital image and an audio file utilizing WCS 500.

In another embodiment, WCS 500 may allow a user to select the type of image, such as black and white, color, etc., the resolution of the image, the magnification of the image, the F stop of the device, etc. and other film attributes commonly know in the art. As such, WCS 500 advantageously allows a user to select make capture a desirable digital image representations and wirelessly communicate images to a network. For example, a user may want to record a black and white image in addition to a color image. As such, the present invention allows a user to select unique qualities of the image prior to communicating the images/information to a network.

In another embodiment, WCS 500 may be operable as a video image recorder, such as a digital video recorder, operable to wirelessly communicate video information to a network. For example, a user may want to record a baseball game and wirelessly communicate the baseball game, comprised of video information, and in one embodiment, associated audio information, to a network.

In one embodiment, WCS 500 includes memory operable to store digital images. The memory may be operable as a removable storage medium associated with storing information. As such, information may be stored locally within WCS 500. The digital information may then be removable memory device associated with the device such that a user may swap memory storage devices. As such, several different memory devices may be used to store desirable information and wirelessly communicate desirable information to a network using WCS 500.

Figure 6:
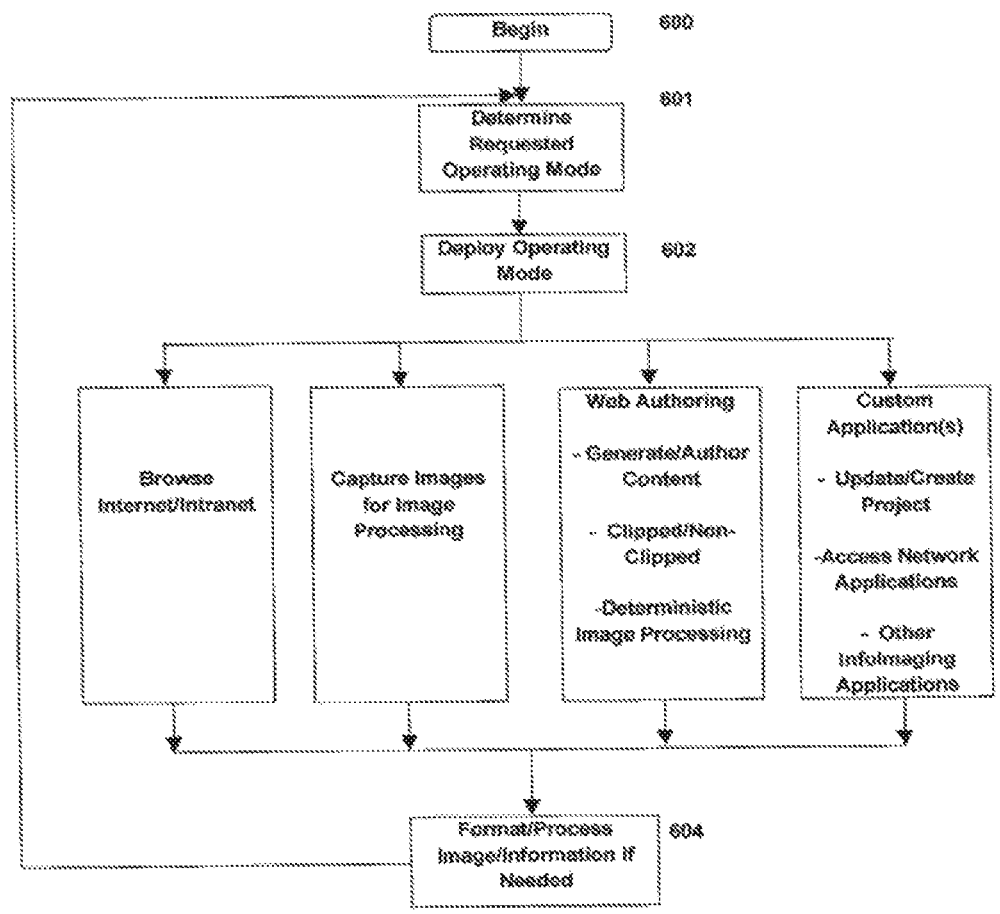
FIG. 6 illustrates a method for providing an operating mode for a wireless communication system according to one aspect of the invention.

FIG. 6 illustrate a method for providing an operating mode for a wireless communication system according to one aspect of the invention. The method may be employed within a program of instructions embodied within a computer readable medium, a memory device, encoded logic, or other devices or systems operable to use a portion or all of the method illustrated in FIG. 6.

The method begins generally at step 600 and may be used in association with wireless communication system (WCS) 500 illustrated in FIG. 5 or with other systems or devices operable to use the method of FIG. 6. At step 601 the method determines an operating mode requested for a WCS. For example, a user may select a browsing mode, an image capturing mode, a web authoring mode, a custom or specific application, or other programs/applications that may be employed by WCS operable to communicate information via a wireless network. Upon determining an operating mode, the method proceeds to step 602 and deploys the selected operating mode. For example, a user may want to launch a browser to preview images, access the Internet, access an Intranet, etc. The method may also employ an image capturing mode operable to allow a user to record images and associate processing with a captured image. A user may also select a web authoring mode allowing a user a multi-source editing platform. For example, a user may author a webpage using one or more digital images associated with a WCS. As such, a user may provides 'tags' to image information and communicate authored website/content to a network location operable to receive the content. In this manner, a user may integrate image content with a website from a remote location without having to manually upload images or alter a path or destination during upload. In this manner, deterministic processing of image information may automatically provide processing information for an image/information communicated by a wireless communication system.

In another embodiment, a user may select a operating mode associated with a custom application or program accessible by a wireless communication system. The program may be local to the wireless communication system or the application may be used in combination with a server wirelessly coupled to the wireless communication system. For example, portions of an application may be resident to the wireless communication system while other portions of an application may be resident to a server. In this manner, processing and wireless communication of information may be reduced at the wireless communication system.

One example of a custom application may be directed towards the insurance industry for assisting with claims processing. A claims adjuster may be in the field previewing a property that received damage during a storm. As such, a claims adjuster may access a companies Intranet and/or database for entering/modifying a claim. Additionally, the claims adjuster may record several images and communicate the images in association with the claim to document the claim. In this manner, the wireless communication system using the custom application may serve as an extension to the insurance companies Intranet for processing claims.

In another embodiment, a user may select an Infoimaging application operable to provide image information in addition to other information for processing. For example, a user may select an application operable to create a project to be used in association with a image/information. For example, a project may include periodically inspecting a construction site for constructing a building and may include processing images and associated information (i.e. date, time, notes, etc.). As such, periodic inspection of a building may be necessary during different stages of a project. As such, a project may be updated/created using a custom application.

In another embodiment, an Infoimaging application may be operable to provide listing images and/or information for real estate. For example, a real estate professional may author a webpage or update listing information for a multiple listing service by providing images and/or information. In another embodiment, a real estate professional may allow a client to capture images and take notes. As such, information may be associated with a home tour and upon the information and/or images being communicated to a network, a website may be dynamically generated/updated for the client thereby providing a list of home tours.

Upon deploying an operating mode the method proceeds to step 604 and formats/processes images/information if needed. The method then proceeds to step 601 and repeats.

Figure 7:
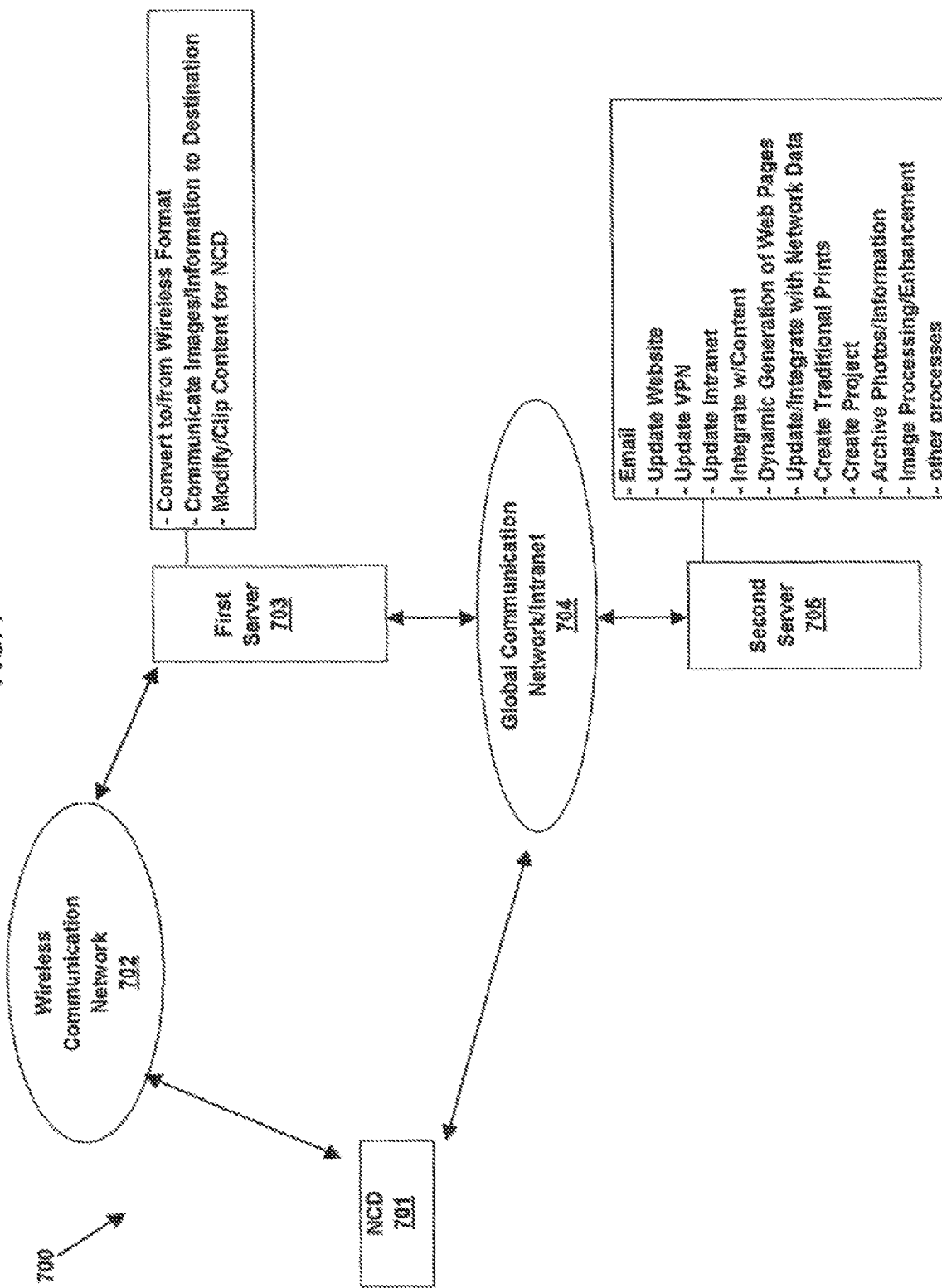
FIG. 7 illustrates a network for communicating information associated with digital images according to one aspect of the invention.

FIG. 7 illustrates a network for communicating information associated with digital images according to one aspect of the invention. A network, illustrated generally at 700, may be operable to communicate information associated with digital images and includes receiving an input from a network communication device (NCD) 701 operable to communicate information associated with digital images. For example, NCD 701 may communicate with the network via a communications module coupled to a device operable to communicate information associated with digital images. In this manner, NCD 701 may be used in associated with a network for communicating digital image information and information accordingly.

In one embodiment, NCD 701 may communicate with global communication network 704 such as the Internet or an Intranet via a landline operable to communicate information between a device and a network. In this manner, a user may couple NCD 701 to a network such as the Internet and communicate images/information to a network location such as a website operable to receive information associated with digital images and process images and information as needed.

In another embodiment, NCD 701 may communicate with wireless communications network 702 operable to communicate information associated with digital images. For example, wireless communications network 702 may include a digital network operable to communicate digital information associated with the images/information. Additionally, wireless communication network 702 may be operable to communicate with a global communications network such as the Internet 704 via first server 703. As such, NCD 701 operable to wirelessly communicate information may communicate with one or more networks 702, 704. Information may then be communicated to a network location associated with the global communication network 704 such as a second server 705 or website operable to receive and process information associated with digital images. For example, the website may convert the information into a format operable to provide conventional photographs representing digital images. In another embodiment, the information may be forwarded as an email to an email address, stored at a network location for future access by one or more users, etc.

In one embodiment, NCD 701 may be operable similar to a disposable camera having a predetermined number of exposures. NCD 701 may then be used to wirelessly communicate with wireless communication network 702 and/or global communication network 704 and a user may digitally record an image and communicate information associated with the image to a network location. For example, NCD 701 may include a device identifier for identifying NCD 701 when communicating with wireless communication network 702. NCD 701 may then be recognized by wireless communication network 702 and then communicate information. Wireless communication network 702, having identified NCD 701, may then communicate information to a processing center. Upon a user using all of the exposures, the user may purchase additional exposures and a wireless signal may be communicated to NCD 701 to reprogram NCD 701 for additional exposures. In this manner, a user may purchase desirable amounts of exposures without having to purchase a new camera or NCD 701.

In one embodiment, the network may be operable to dynamically generate a website in response to receiving wirelessly communicated information associated with digital images from NCD 701. For example, a website may include one or more webpages uniquely generated for the user of NCD 701 and may be operable to use Java based objects for improved navigation, appearance, and functionality of the website and associated simulations. Java is an object oriented language which may be executed by a Java interpreter and run on most computers and operating systems such as UNIX, Macintosh OS, and Windows. Additionally, network 700 may be operable to utilize many different types of markup languages for accessing and providing information associated with digital image information. Markup languages may include, for example, hyper text mark-up language (HTML), extensible mark-up language (XML), wireless mark-up language (WML), etc. and various communication protocols such as Internet Protocol (IP), Transmission Control Protocol (TCP), Transmission Control/Internet Protocol (TC/IP), Wireless Application Protocol (WAP), File Transfer Protocol (FTP), Picture Transfer Protocol (PTP), Image Transfer Protocol (ITP), etc. for communicating information associated with digital images. For example, network 700 may be operable to use TCP/IP and/or WAP communication in which a client terminal, such as wireless device, requests service (such as sending a Web page) by another computer, such as a server coupled via the network. In this manner, information associated with digital images may be communicated using TC/IP communication and/or WAP.

Figure 8:
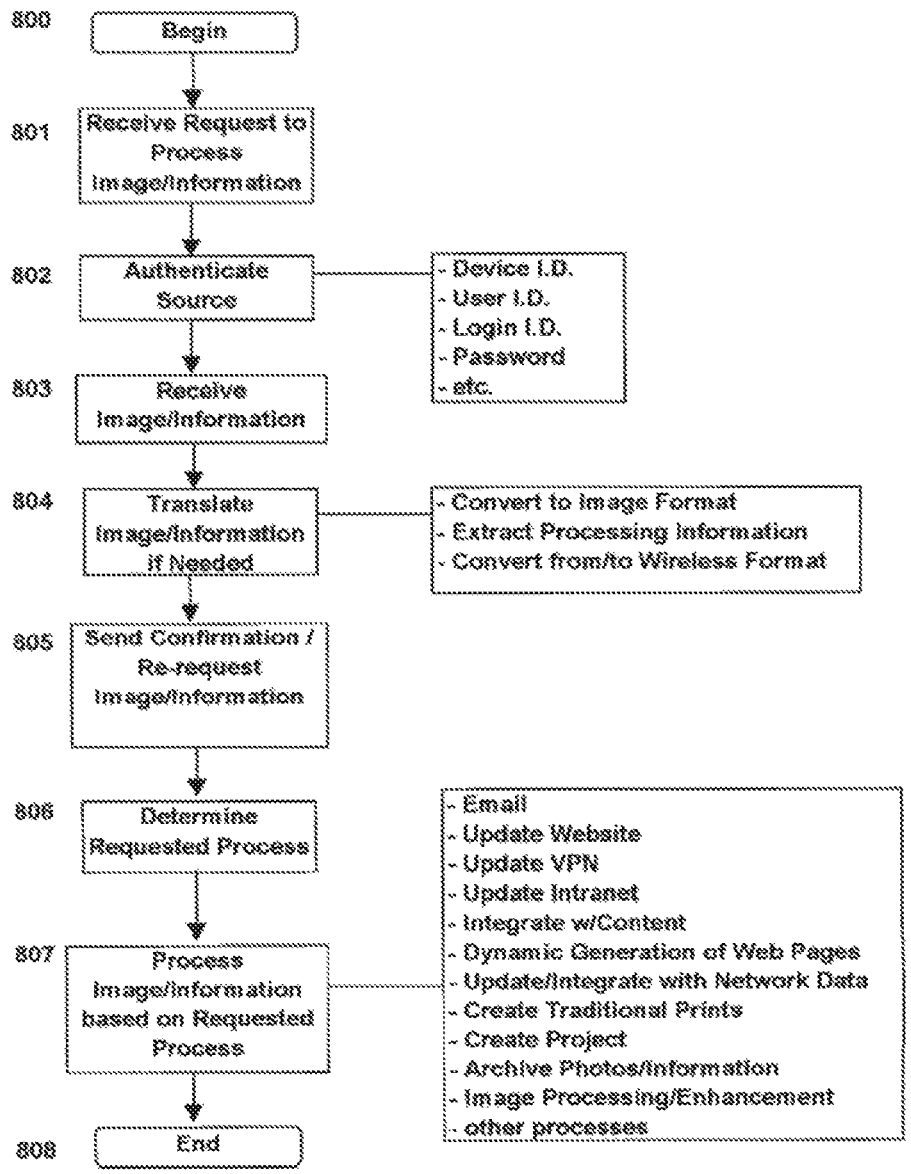
FIG. 8 illustrates a method for processing communicated information associated with digital images according to one aspect of the invention.

FIG. 8 illustrates a method for processing communicated information associated with digital images according to one aspect of the invention. The method may be employed within a program of instructions embodied within a computer readable medium, a memory device, encoded logic, or other devices or systems operable to use a portion or all of the method illustrated in FIG. 8.

The method begins generally at step 800. At step 801 a network location, such as a website, processing center, Intranet, wireless communication server, etc., receives a request to process image/information. For example, the image and/or associated image information may be communicated to a processing center operable to receive and process images/information. Upon receiving a request to process information, the method proceeds to step 802 and authenticates the requesting source. For example, a device/client may request processing using a semi-private of private network. As such, a device I.D., User I.D., Login I.D., password, etc. may be provided and authenticated to validate a request. Upon validating a request information is received at step 803 from the requesting source. In one embodiment, one or more directories may be created for storing the images/information. Upon receiving the images/information, the method proceeds to step 804 and determines if the images/information need to be translated. For example, the images may be communicated using a specific protocol and/or format and may require translating to a format operable to be used by a processing center. For example, an image may be communicated to a network location via a wireless network. The image may be communicated in segments and as such may require assembly prior to processing. For example, a 100 Kilobyte image may be communicated in fifty segments with each segment representing a specific portion of an image file. As such, and image may be assembled into a format using each of the fifty segments.

Upon translating images/information if needed, the method proceeds to step 805 and communicates a confirmation or request for a segment that may not have been received or may have been corrupted during communication. For example, segment thirty-seven of fifty may not have been received or may have become corrupted during communication. As such, the method may send a request to an originating device for the specific segment needed for the image. In this manner, a segment may be retrieved when needed.

In one embodiment, a network may communicate image/information in a discrete packet including a segment of image/information. Some wireless communication systems may include a transfer protocol for an entire image. However, other wireless networks may not have such a protocol. As such segmenting image/information using a wireless communication system and translating the segmented information into an image file may be well suited for such networks. For example, a digital paging network may be operable to communicate binary information between an originating source and a destination. As such, the paging network may be configured to communicate two kilobytes of information per transmission. A digital image/information may be segmented by a wireless communication system and communicated to a destination/processing center and reassembled to provide the image/information into its original format. In one embodiment, a wireless communication system may include several paging transceivers operable to communicate several segments of information. As such, an increase in bandwidth may be realized by the wireless communication system for communicating images/information employing plural transceivers.

Upon confirming and/or requesting image/information the method proceeds to step 806 and determines the process requested. For example, the processing information may be included within the image file or provided in association with an image. As such, the method accesses image information and proceeds to step 807 and processes an image based on a process selected via a wireless communication module. For example, processing may include converting a digital image into a traditional prints and delivering the traditional prints to a physical location. As such, the method may queue images/information until a predetermined number of images are received. For example, a user may have purchased fifty photos. As such, upon all fifty photos being communicated to the processing center, the fifty photos may be queued for traditional processing and delivered accordingly. In this manner, delivery and processing information (i.e. street address, size prints, color, type, custom, etc.) may be provided in association with or within the image information and extracted prior to converting the images into traditional prints. As such, image/information may include several different types of information for processing at a processing center. Upon processing the images/information, the method proceeds to step 808 where the method ends. In this manner, images/information having deterministic processing information may be communicated to one or more destinations.

One application for using the method of FIG. 8 may include dynamically generating websites and/or associated web pages using deterministic processing information included within an image file or in association with an image. For example, a real estate professional may use a digital camera operable to capture image information. One such device may include a personal digital assistant, such as a Palm device, having image capturing capabilities. A program resident to a Palm may allow real estate professional to enter a listing number identifying a property being toured. The agent may then allow a client to take photographs and associate notes, memos, audio files, data, etc. with digital images while touring a home. In this manner, a client may tour several homes throughout the day and capture images/information for each home. Images/information may then be processed/formatted to include deterministic processing data for dynamically generating home tours. The images/information for each client may then be communicated via a wireless or wireline network and home tours may be dynamically generated for each client within a virtual private network for viewing. A process center may combine the images/information with listing data to create a personalized website for each client. In this manner, an agent may generate web based home tours for their clients using images/information having deterministic processing information.

Other embodiments of the method of FIG. 8 may be realized in accordance with the present invention. For example, processing may include determining the number of exposures remaining in a wireless communications device. As such, the method may communicate a signal to the device in response to determining the number of exposures remaining In another embodiment, processing may include communicating with a wireless communication device to provide additional exposures. For example, a user may access a website, contact a vendor, etc. and purchase additional exposures. As such, a processing center operable to communicate with the device may provide additional exposures. For example, the processing center may provide information to a wireless network operable to communicate with a wireless device. The information may include information that may be downloaded or received by the wireless device for reconfiguring the device for additional exposures. Other embodiments of communicating with the wireless device from the processing center may include transmitting other types of information to the device. Such information may include advertising, emails, etc.

Figure 9:
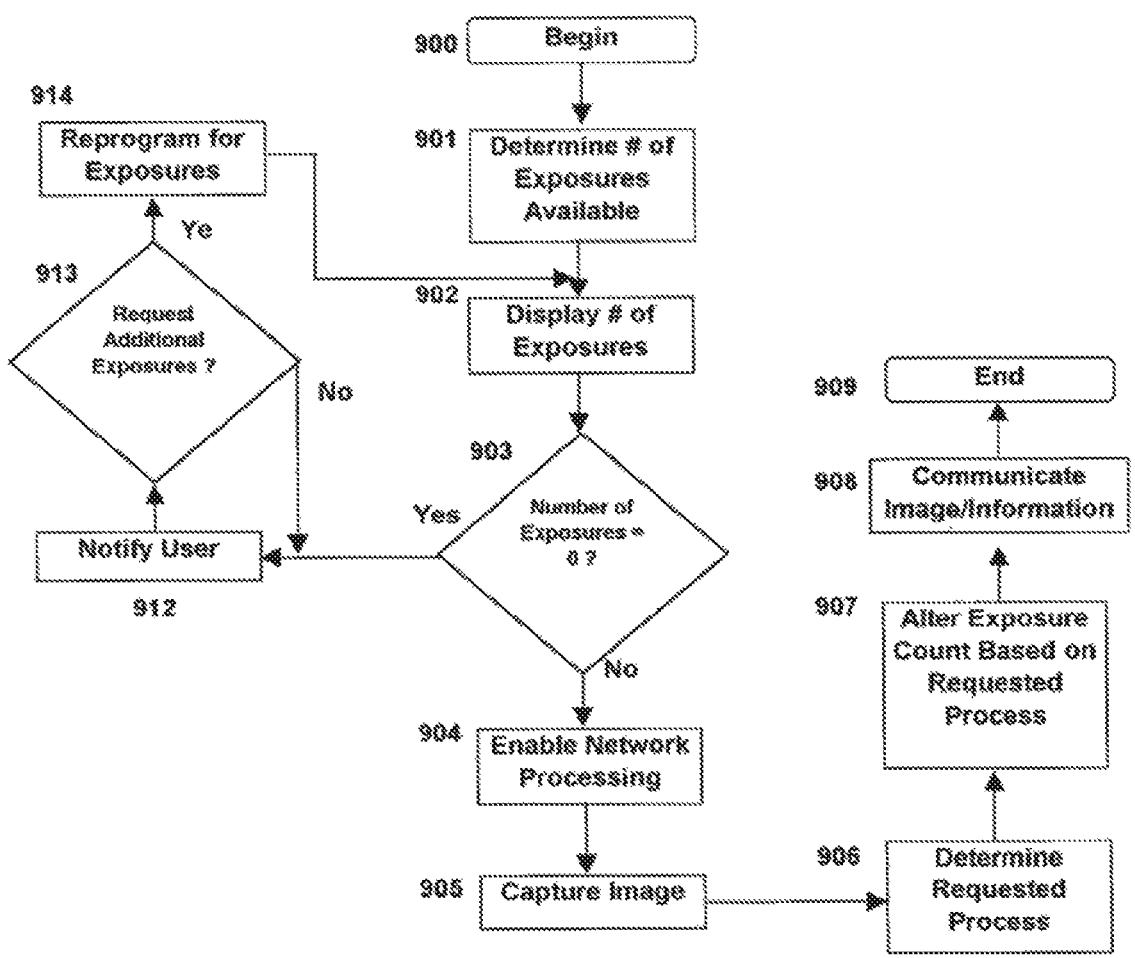
FIG. 9 illustrates a method for providing a digital image capturing device having programmable exposures according to one aspect of the invention.

FIG. 9 illustrates a method for providing a digital image capturing device having programmable exposures according to one aspect of the invention. The method may be employed within a program of instructions embodied within a computer readable medium, a memory device, encoded logic, or other devices or systems operable to use a portion or all of the method illustrated in FIG. 9.

The method begins generally at step 900. At step 901 the method determines the number of exposures available for a wireless communication device operable as a digital camera. For example, a user may have paid for fifty exposures and have used fifteen of the exposures leaving a total of thirty-five remaining. As such the method displays the number of exposures at step 902 and determines the number of exposures at step 903. If the number of exposures is equal to zero, the method proceeds to step 912 and notifies a user that no exposures are available. The method then proceeds to step 913 where a user may request additional exposures and to step 914 where the camera is re-programmed for a new number of exposures. For example, a user may request and purchase exposures via Internet, wireless network using the camera, conventional wireline, telephone service, etc. Upon purchasing the exposures, a signal may be communicated the camera reprogramming the camera for additional exposures. Upon determining the number of exposure does not equal zero, the method proceeds to step 904 where the network processing is enabled and to step 905 where a user may capture an image. Upon a user capturing an image, the method proceeds to step 906 where the method determines a processing to be associated with the image and to step 907 where a counter is decreased indicating that an exposure has been used. The method then proceeds to step 908 where the image/information is communicated to a destination for processing. For example, a user may want to create an online photo album, generate traditional prints to be processed, email an image/information, or other processes operable to be used in association with digital images. The method then proceeds to step 909, where the method ends.

In one embodiment, information may be wirelessly communicated having a certain level of encryption thereby allowing a user to securely communicate image information and/or request for additional photos, credit card information, confidential information, etc. Encryption is the conversion of data into a form, called a cipher, that cannot be easily understood by unauthorized people. Decryption is the process of converting encrypted data back into its original form, so it can be understood. Simple ciphers include the substitution of letters for numbers, the rotation of letters in the alphabet, and the "scrambling" of voice signals by inverting the sideband frequencies. More complex ciphers work according to sophisticated computer algorithms that rearrange the data bits in digital signals.

In order to easily recover the contents of an encrypted signal, the correct decryption key is required. The key is an algorithm that "undoes" the work of the encryption algorithm. Alternatively, a computer can be used in an attempt to "break" the cipher. The more complex the encryption algorithm, the more difficult it becomes to eavesdrop on the communications without access to the key.

Encryption/decryption is especially important in wireless communications. This is because wireless circuits are easier to "tap" than their hard-wired counterparts. Nevertheless, encryption/decryption is a good idea when carrying out any kind of sensitive transaction, such as a credit-card purchase online, or the discussion of a company secret between different departments in the organization.

Wireless communication of information associated with digital images may be provided in a plurality of ways. Some examples of wireless communication systems and protocols operable to be used with the present invention are provided below and may include, but are not limited to, CDMA, GSM, TDMA, PCS, UMTS, and GPS.

Wireless refers to a communications, monitoring, or control systems in which electromagnetic or acoustic waves carry a signal through atmospheric space rather than along a wire. In most wireless systems, radio-frequency (RF) or infrared (IR) waves are used. CDMA (code-division multiple access)

CDMA, one of the three wireless telephone transmission technologies, takes an entirely different approach from GSM and the similar TDMA. CDMA, after digitizing data, spreads it out over the entire bandwidth it has available. Multiple calls are overlaid over each other on the channel, with each assigned a unique sequence code. The digital wireless personal communication service (PCS) is expected to use CDMA widely in the United States.

GSM (Global System for Mobile communication) GSM (Global System for Mobile communication) is a digital mobile telephone system that is widely used in Europe and other parts of the world. GSM uses a variation of time division multiple access (TDMA) and is the most widely used of the three digital wireless telephone technologies (TDMA, GSM, and CDMA). GSM digitizes and compresses data, then sends it down a channel with two other streams of user data, each in its own time slot. It operates at either the 900 MHz or 1800 MHz frequency band. GSM is the de facto wireless telephone standard in Europe. GSM has over 120 million users worldwide and is available in 120 countries, according to the GSM MoU Association. Since many GSM network operators have roaming agreements with foreign operators, users can often continue to use their mobile phones when they travel to other countries. American Personal Communications (APC), a subsidiary of Sprint, is using GSM as the technology for a broadband personal communications service (PCS). The service will ultimately have more than 400 base stations for the palm-sized handsets and is part of an evolution of wireless mobile telecommunication that includes High-Speed Circuit-Switched Data (HSCSD), General Packet Radio System (GPRS), Enhanced Data GSM Environment (EDGE), and Universal Mobile Telecommunications Service (UMTS).

TDMA (Time Division Multiple Access)

TDMA (time division multiple access) is a technology used in digital cellular telephone communication to divide each cellular channel into three time slots in order to increase the amount of data that can be carried. TDMA is used by Digital-American Mobile Phone Service (D-AMPS), Global System for Mobile communications (GSM), and Personal DigitalCellular (PDC). However, each of these systems implements TDMA in a somewhat different and incompatible way. An alternative multiplexing scheme to FDMA with TDMA is code division multiple access (CDMA), which takes the entire allocated frequency range for a given service and multiplexes information for all users across the spectrum range at the same time.

PCS (Personal Communlcabxons Services)

PCS (personal communications services) is a wireless phone service somewhat similar to cellular telephone service but emphasizing personal service and extended mobility. It's sometimes referred to as digital cellular (although cellular systems can also be digital). Like cellular, PCS is for mobile users and requires a number of antennas to blanket an area of coverage. As a user moves around, the user's phone signal is picked up by the nearest antenna and then forwarded to a base station that connects to the wired network. The phone itself is slightly smaller than a cellular phone. PCS is being introduced first in highly urban areas for large numbers of users.

The "personal" in PCS distinguishes this service from cellular by emphasizing that, unlike cellular, which was designed for car phone use with transmitters emphasizing coverage of highways and roads, PCS is designed for greater user mobility. It generally requires more cell transmitters for coverage, but has the advantage of fewer blind spots. Technically, cellular systems in the United States operate in the 824-849 megahertz (MHz) frequency bands; PCS operates in the 1850-1990 MHz bands. Several technologies are used for PCS in the United States, including Cellular Digital Packet Data (CDPD) and Global System for Mobile (GSM) communication. GSM is more commonly used in Europe and elsewhere.

UMTS (Universal Mobile Telecommunications System) UMTS (Universal Mobile Telecommunications System) is a so-called "third-generation (3G)," broadband, packet-based transmission of text, digitized voice, video, and multimedia at data rates up to and possibly higher than 2 megabits per second (Mbps), offering a consistent set of services to mobile computer and phone users no matter where they are located in the world.

Based on the Global System for Mobile (GSM) communication standard, UMTS, endorsed by major standards bodies and manufacturers, is the planned standard for mobile users around the world by 2002. Once UMTS is fully implemented, computer and phone users can be constantly attached to the Internet as they travel and, as they roam, have the same set of capabilities no matter where they travel to. Users will have access through a combination of terrestrial wireless and satellite transmissions. Until UMTS is fully implemented, users can have multi-mode devices that switch to the currently available technology (such as GSM 900 and 1800) where UMTS is not yet available.

Present cellular systems are mainly circuit-switched, with connections always dependent on circuit availability. Packet-switched connection, using the Internet Protocol (IP), means that a virtual connection may always be available to any other end point in the network. It will also make it possible to provide new services, such as alternative billing methods (pay-per-bit, pay-per-session, flat rate, asymmetric bandwidth, and others). The higher bandwidth of UMTS also promises new services, such as video conferencing. UMTS promises to realize the Virtual Home Environment (VHE) in which a roaming user can have the same services to which the user is accustomed when at home or in the office, through a combination of transparent terrestrial and satellite connections. The spectrum for UMTS has been identified as frequency bands 1885-2025 MHz for future IMT-2000 systems, and 1980-2010 MHz and 2170-2200 MHz for the satellite portion of UMTS systems.

Although the disclosed embodiments have been described in detail, it should be understood that various changes, substitutions and alterations can be made to the embodiments without departing from their spirit and scope. For example, the present invention may be realized in association with several different types of wireless communication devices which may include, but are not limited to, personal digital assistants (PDAs), cellular communication devices, cellular telephones, wireless paging devices, wireless computing systems, or other systems and/or wireless devices.

What is claimed is:

1. A method for communicating information associated with digital images including the steps of:
    providing a first non-transitory medium having a network location;
    providing a second non-transitory medium, the second non-transitory medium including a wireless digital image capturing device;
    providing a software routine resident on the first non-transitory medium for wirelessly relaying instructions between the first and the second non-transitory mediums;
    detecting a user initiated request communicated wirelessly from the wireless digital image capturing device to wirelessly transmit a digital image from the secondary non-transitory medium to the first non-transitory medium;
    authenticating the user initiated request with a login identification associated with the user and the network location uniquely generated for the user;
    prompting the user to provide identifier information for the digital image wirelessly from the wireless digital image capturing device and encoding the network destination information provided by the user within a portion of the digital image, the network destination information operable to uniquely identify a process for processing the digital image;
    wherein the process for processing the digital image comprises at least one process selected from the group consisting of compressing the digital image, filtering the digital image, generating a thumbnail of the digital image, flagging the digital image for subsequent thumbnail generation, resizing the digital image, converting the digital image to a different digital format, updating a database with the image, converting the digital image to a traditional print, dynamically generating a web site containing the digital image, dynamically generating a web page containing the digital image and combinations thereof; and
    updating the network location wirelessly with the digital image and associated identifier information.

2. The method of claim 1, further including a step of generating a project by processing the digital image and a series of related digital images based on processing information including at least date information of the digital image and related digital images.

3. The method of claim 1, further including a step of processing the digital image including at least one of resizing and compressing the digital image.

4. The method of claim 3, further including the step of creating one or more directories for storing the processed digital images locally in a memory device associated with the first non-transitory medium.

5. The method of claim 4, further including wirelessly communicating images stored on the memory device to additional select network locations via a mark image command from the wireless digital image capturing device.

6. The method of claim 5, wherein the mark image command includes a further step of prompting the user to select which network location is generated and presented via a soft key on the wireless image capturing device.

7. The method of claim 6, wherein the step of updating the network location includes updating a webpage.

8. The method of claim 3, wherein the step of processing the digital image further includes processing a plurality of digital images and includes a step of storing the digital images in a memory device associated with the first non-transitory medium and providing access to the wireless image capturing device to select which digital images should be processed.

9. The method of claim 8, wherein the step of processing includes filtering the digital image and generating a thumbnail of the filtered digital image.

10. The method of claim 1, including a step of providing a memo associated with the digital image from the wireless digital image capturing device.

11. The method of claim 1, including a step of associating the login identification with the wireless digital image capturing device.

12. A method for communicating information associated with digital images including the steps of:
    providing a first non-transitory medium having a first network location;
    providing a second non-transitory medium, the second non-transitory medium including a wireless digital image capturing device;
    providing a software routine resident on the first non-transitory medium for wirelessly relaying instructions between the first and the second non-transitory mediums;
    detecting a user initiated request communicated wirelessly from the wireless digital image capturing device to transmit a digital image wirelessly from the second non-transitory medium to the first non-transitory medium;
    authenticating the user initiated request with a login identification associated with both the wireless digital image capturing device and the first network location, encoding image process information and network destination information provided by the user in at least one of a title of the digital image or within a portion of the digital image, the image process information operable to uniquely identify a process for processing the digital image;
    wherein the process information for processing the digital image comprises at least one process selected from the group consisting of compressing the digital image, filtering the digital image, generating a thumbnail of the digital image, flagging the digital image for subsequent thumbnail generation, resizing the digital image, converting the digital image to a different digital format, updating a database with the image, converting the digital image to a traditional print, dynamically generating a web site containing the digital image, dynamically generating a web page containing the digital image and combinations thereof;
    receiving a digital image wirelessly from the wireless image capturing device and storing it in a memory device associated with the first non-transitory medium, designating an associated process to employ on the digital image based on the image process information encoded in the at least one of the title or a portion of the digital image; and updating the first network location with the digital image.

13. The method of claim 12, wherein the process includes the further step of generating a project with at least one additional digital image having the same encoded process information.

14. The method of claim 13, including a further step wherein the digital image and the at least one additional digital image are generated into thumbnails.

15. The method of claim 13, including the further step of providing a memo associated with the digital image from the wireless digital image capturing device.

16. The method of claim 12, wherein the step of updating the first network location includes the step of updating a webpage uniquely generated for the user.

17. The method of claim 16, including the further step of prompting the user to mark the digital image from the wireless image capturing device to be wirelessly communicated to additional network locations.

18. The method of claim 17, including the step of prompting the user to select from the wireless image capturing device which network locations of the additional network locations to share the digital image with.

19. The method of claim 17, including the further step wherein the step of prompting the user to select which network location is generated and presented via a soft key on the wireless image capturing device.

* * * * *